(12) United States Patent
Kei

(10) Patent No.: US 12,306,389 B2
(45) Date of Patent: May 20, 2025

(54) CONFOCAL SCANNER, CONFOCAL SCANNER SYSTEM, AND CONFOCAL MICROSCOPE SYSTEM

(71) Applicant: YOKOGAWA ELECTRIC CORPORATION, Tokyo (JP)

(72) Inventor: Takayuki Kei, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 508 days.

(21) Appl. No.: 17/747,498

(22) Filed: May 18, 2022

(65) Prior Publication Data

US 2022/0390729 A1 Dec. 8, 2022

(30) Foreign Application Priority Data

Jun. 4, 2021 (JP) ................... 2021-094660

(51) Int. Cl.
G02B 21/00 (2006.01)
(52) U.S. Cl.
CPC ....... G02B 21/0032 (2013.01); G02B 21/008 (2013.01)
(58) Field of Classification Search
CPC ............ G02B 21/0032; G02B 21/0044; G02B 21/008; G02B 21/0076; G02B 21/0036; G02B 21/004; G02B 21/0048; G02B 6/4221; G02B 19/00; G02B 19/0004; G02B 19/0009; G02B 19/0014; G02B 19/0019; G02B 21/00; G02B 21/0004; G02B 21/0008; G02B 21/0016; G02B 21/002; G02B 21/0024; G02B 21/0028; G02B 21/0088; G02B 21/0092; G02B 21/364; G02B 21/0052

USPC .......... 359/385, 368, 346; 358/382
See application file for complete search history.

(56) References Cited

U.S. PATENT DOCUMENTS

| | | | | |
|---|---|---|---|---|
| 5,969,846 A | * | 10/1999 | Kishi | G02B 21/0064 359/227 |
| 6,934,079 B2 | * | 8/2005 | Hell | G02B 21/0044 359/368 |
| 2011/0090553 A1 | * | 4/2011 | Kei | G02B 21/0076 359/235 |
| 2017/0192216 A1 | * | 7/2017 | Bathe | G02B 27/58 |
| 2022/0107487 A1 | * | 4/2022 | Dennis | G01J 3/0229 |

FOREIGN PATENT DOCUMENTS

| | | | |
|---|---|---|---|
| JP | H1062691 A | * | 3/1998 |
| JP | 6484234 B2 | | 3/2019 |
| WO | 2015/000764 A1 | | 1/2015 |

* cited by examiner

*Primary Examiner* — Hoan C Nguyen
(74) *Attorney, Agent, or Firm* — WHDA, LLP

(57) ABSTRACT

A confocal scanner (21) according to the present disclosure includes a first pinhole array disk (211*a*), a second pinhole array disk (211*b*), a condensing element array disk (212) located between the first pinhole array disk (211*a*) and the second pinhole array disk (211*b*), a connecting shaft (213) connecting the first pinhole array disk (211*a*), the second pinhole array disk (211*b*), and the condensing element array disk (212), and a motor (214) configured, together with the connecting shaft (213), to rotate the first pinhole array disk (211*a*), the second pinhole array disk (211*b*), and the condensing element array disk (212). The first pinhole array disk (211*a*) is located at a first focal plane, the second pinhole array disk (211*b*) is located at a second focal plane.

9 Claims, 11 Drawing Sheets

CONFOCAL SCANNER, CONFOCAL SCANNER SYSTEM, AND CONFOCAL MICROSCOPE SYSTEM

CROSS-REFERENCE TO RELATED APPLICATION

The present application claims priority to Japanese Patent Application No. 2021-094660 filed on Jun. 4, 2021, the entire contents of which are incorporated herein by reference.

TECHNICAL FIELD

The present disclosure relates to a confocal scanner, a confocal scanner system, and a confocal microscope system.

BACKGROUND

Technology related to a microlens Nipkow disk-type confocal scanner, which is used in confocal microscope systems, is known.

For example, patent literature (PTL) 1 discloses an apparatus for suppressing crosstalk, i.e., mutual interference of beams of different wavelengths, between luminous emissions as light to be measured when a sample under investigation is simultaneously illuminated and detected with a plurality of illumination sources and emission wavelengths. In such an apparatus, illumination light of a first illumination wavelength and illumination light of a second illumination wavelength are respectively irradiated onto different locations in a confocal scanner formed by a set of a pinhole array disk and a condensing element array disk. At least one of these illumination lights passing through the confocal scanner is deflected by a beam splitter device located between the confocal scanner and an objective lens. The irradiation positions of each illumination light on the sample therefore do not overlap, leading to suppression of crosstalk.

CITATION LIST

Patent Literature

PTL 1: JP 6484234 B2

SUMMARY

A confocal scanner according to an embodiment includes:
a first pinhole array disk in which a plurality of first pinholes is arranged in an array;
a second pinhole array disk in which a plurality of second pinholes is arranged in an array;
a condensing element array disk, on which a plurality of condensing elements is arranged in an array, located between the first pinhole array disk and the second pinhole array disk;
a connecting shaft connecting the first pinhole array disk, the second pinhole array disk, and the condensing element array disk; and
a motor configured, together with the connecting shaft, to rotate the first pinhole array disk, the second pinhole array disk, and the condensing element array disk, wherein
the first pinhole array disk is attached to the connecting shaft so that one first pinhole is positioned at a first focal plane of one condensing element in the condensing element array disk, and
the second pinhole array disk is attached to the connecting shaft so that one second pinhole is positioned at a second focal plane of one condensing element in the condensing element array disk.

BRIEF DESCRIPTION OF THE DRAWINGS

In the accompanying drawings.

DETAILED DESCRIPTION

Figure 1:
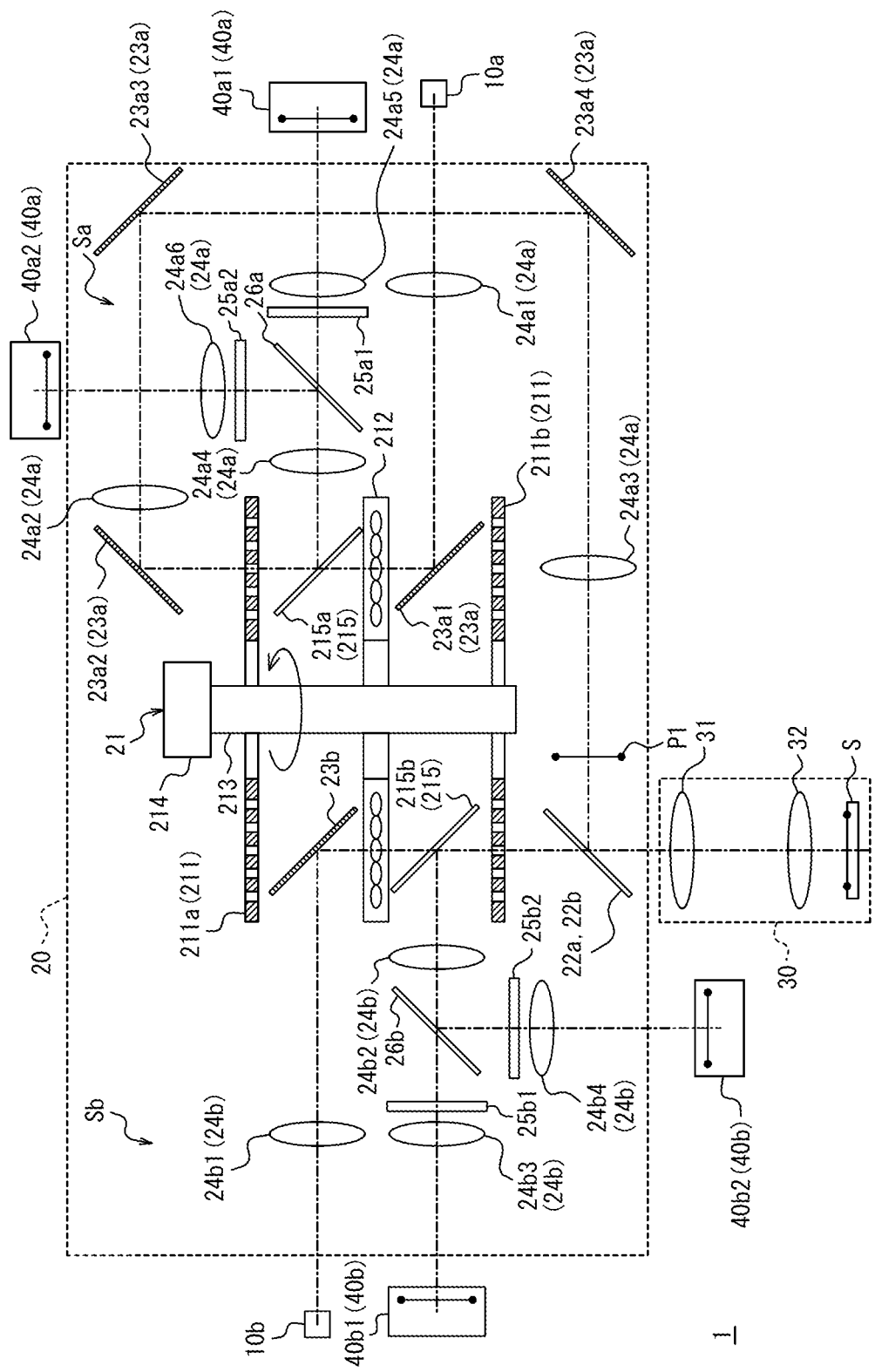
FIG. 1 is a schematic diagram illustrating an example configuration of a confocal microscope system according to an embodiment.

The amount of deflection with above-mentioned conventional technology is extremely small, on the order of several hundred micrometers, and precise adjustment is required with respect to the deflection of the illumination light. Therefore, it is not easy to manufacture and manage the apparatus. In addition, if the apparatus is operated for an extended period of time, changes in the deflection of the illumination light over time also pose a problem.

It would be helpful to provide a confocal scanner, a confocal scanner system, and a confocal microscope system that enable suppression of crosstalk between lights to be measured without requiring precise adjustment of the optical system.

A confocal scanner according to an embodiment includes:
a first pinhole array disk in which a plurality of first pinholes is arranged in an array;
a second pinhole array disk in which a plurality of second pinholes is arranged in an array;
a condensing element array disk, on which a plurality of condensing elements is arranged in an array, located between the first pinhole array disk and the second pinhole array disk;
a connecting shaft connecting the first pinhole array disk, the second pinhole array disk, and the condensing element array disk; and
a motor configured, together with the connecting shaft, to rotate the first pinhole array disk, the second pinhole array disk, and the condensing element array disk, wherein the first pinhole array disk is attached to the connecting shaft so that one first pinhole is positioned at a first focal plane of one condensing element in the condensing element array disk, and the second pinhole array disk is attached to the connecting shaft so that one second pinhole is positioned at a second focal plane of one condensing element in the condensing element array disk.

This enables suppression of crosstalk between the lights to be measured without requiring precise adjustments to the optical system. For example, the confocal scanner does not require an optical element, as in conventional technology, that defects the direction of the irradiation light so that the excitation sites on the sample by the first confocal scanner and the second confocal scanner do not overlap. The confocal scanner does not require highly precise mechanism adjustment as in conventional technology, and by using the two pinhole array disks, the confocal scanner can, with the discs themselves, suppress the overlap of excitation sites on the sample by the first confocal scanner and the second confocal scanner. Accordingly, the assembly and adjustment of the apparatus are easy, and robustness of the apparatus is easily achieved.

A confocal scanner according to an embodiment may further include a branching element disposed between the first pinhole array disk and the condensing element array disk and/or between the second pinhole array disk and the condensing element array disk. This configuration enables the confocal scanner to separate the optical path of the irradiation light coming from the light source and the optical path of the fluorescent light coming from the sample on the microscope. As a result of the confocal scanner including two branching elements, the same effect can be achieved for both the first confocal scanner and the second confocal scanner.

In a confocal scanner according to an embodiment, the plurality of first pinholes may be arranged in the first pinhole array disk at equal pitch and in a spiral, and the plurality of second pinholes may be arranged in the second pinhole array disk at equal pitch and in a spiral. With this configuration, the confocal scanner can scan a sample on the microscope at high speed with the irradiation light from the light source in both the first confocal scanner and the second confocal scanner.

In a confocal scanner according to an embodiment, an arrangement of the plurality of first pinholes in the first pinhole array disk and an arrangement of the plurality of second pinholes in the second pinhole array disk may be identical. This configuration further facilitates design of the confocal scanner.

A confocal scanner system according to an embodiment may include:
  any of the aforementioned confocal scanners;
  a first optical system including a first confocal scanner formed by a combination of the first pinhole array disk and the condensing element array disk, the first optical system being configured to guide first irradiation light through the first confocal scanner to a microscope that contains a sample and guide first light to be measured based on the first irradiation light from the sample to a first detector, the first light to be measured contributing to a first confocal image; and
  a second optical system including a second confocal scanner formed by a combination of the second pinhole array disk and the condensing element array disk, the second optical system being configured to guide second irradiation light through the second confocal scanner to the microscope and guide second light to be measured based on the second irradiation light from the sample to a second detector, the second light to be measured contributing to a second confocal image.

This enables suppression of crosstalk between the lights to be measured without requiring precise adjustments to the optical system. For example, the confocal scanner system does not require an optical element, as in conventional technology, that defects the direction of the irradiation light so that the excitation sites on the sample by the first confocal scanner and the second confocal scanner do not overlap. The confocal scanner system does not require highly precise mechanism adjustment as in conventional technology, and by using the two pinhole array disks, the confocal scanner can, with the discs themselves, suppress the overlap of excitation sites on the sample by the first confocal scanner and the second confocal scanner. Accordingly, the assembly and adjustment of the apparatus are easy, and robustness of the apparatus is easily achieved.

In a confocal scanner system according to an embodiment, the first optical system may include a first set of relay lenses connecting a pinhole surface of the first pinhole array disk and an image plane of the microscope in a conjugate relationship and a second set of relay lenses connecting a pinhole surface of the first pinhole array disk and a light-receiving surface of the first detector in a conjugate relationship. This enables the proper construction of an optical system while maintaining the conjugate relationship between the pinhole surface of the first pinhole array disk, the image plane of the microscope, and the light-receiving surface of the first detector.

A confocal microscope system according to an embodiment may include:
  any of the aforementioned confocal scanner systems;
  a first light source configured to irradiate the first irradiation light that enters the confocal scanner system;
  a second light source configured to irradiate the second irradiation light that enters the confocal scanner system;
  the microscope containing the sample irradiated by the first irradiation light and the second irradiation light;
  the first detector configured to detect the first light to be measured from the sample; and
  the second detector configured to detect the second light to be measured from the sample.

This enables suppression of crosstalk between the lights to be measured without requiring precise adjustments to the optical system. For example, the confocal microscope system does not require an optical element, as in conventional technology, that defects the direction of the irradiation light so that the excitation sites on the sample by the first confocal scanner and the second confocal scanner do not overlap. The confocal microscope system does not require highly precise mechanism adjustment as in conventional technology, and by using the two pinhole array disks, the confocal scanner can, with the discs themselves, suppress the overlap of excitation sites on the sample by the first confocal scanner and the second confocal scanner. Accordingly, the assembly and adjustment of the apparatus are easy, and robustness of the apparatus is easily achieved.

In a confocal microscope system according to an embodiment, a diameter of the first pinholes may be determined based on a wavelength of the first irradiation light, and a diameter of the second pinholes may be determined based on a wavelength of the second irradiation light. By designing the pinhole diameters in proportion to the wavelength of the irradiation light, the transmittance and confocality of the irradiation light become equal to each other for different pinhole array disks, and a balanced confocal image can be obtained.

In a confocal microscope system according to an embodiment, the first light source may irradiate first irradiation light having a first wavelength and a third wavelength, the second light source may irradiate second irradiation light having a second wavelength and a fourth wavelength, the first detector may include a pair of detectors configured respectively to detect the first light to be measured based on the first wavelength and on the third wavelength, the second detector may include a pair of detectors configured respectively to detect the second light to be measured based on the second wavelength and on the fourth wavelength, and the first wavelength, the second wavelength, the third wavelength, and the fourth wavelength may increase in length in this order. This enables the confocal microscope system to obtain confocal images by imaging in four colors.

According to the present disclosure, a confocal scanner, a confocal scanner system, and a confocal microscope system that enable suppression of crosstalk between lights to be measured without requiring precise adjustment of the optical system can be provided.

The background and problems with conventional technology are described in greater detail.

A typical configuration of a microlens Nipkow disk-type confocal scanner in conventional technology is now described. Such a confocal scanner has a pinhole array disk. The pinhole array disk allows signal light to pass only in the focal plane observed by the objective lens of the microscope. The confocal scanner blocks noise light outside of the focal plane. A confocal image is obtained from these pinholes.

The confocal scanner also has a microlens array disk. The microlens array disk improves the efficiency of illumination light used to illuminate the sample on the microscope. The position of each pinhole formed on the pinhole array disk and the position of each microlens formed as a condensing means on the microlens array disk are in a one-to-one relationship with each other.

The confocal scanner also has a connecting shaft that connects the pinhole array disk and the microlens array disk. The tip of the connecting shaft to which the pinhole array disk and the microlens array disk are attached is attached to a motor. The motor, together with the connecting shaft, rotates the pinhole array disk and the microlens array disk in the same direction. The confocal scanner further has a beam splitter to separate the optical path of the illumination light from the optical path of the signal light.

The function of the confocal scanner is achieved by the pinhole array disk and the microlens array disk being rotated in the same direction by the motor. In the conventional technology described above, the pinhole diameter on the pinhole array disk is one type and fixed.

A problem with the above-described microlens Nipkow disk-type confocal scanner is the presence of fluorescence crosstalk between different fluorescent dyes, such as fluorescent proteins, included in the sample. Such a problem is found across high-content analysis systems, drug discovery support devices, epifluorescence microscopes, and confocal fluorescence microscopes that are based on fluorescence imaging.

The fluorescence spectrum of fluorescent dyes is distributed over a wide wavelength band. Therefore, when a plurality of fluorescent dyes in a multiply stained sample are excited simultaneously, overlap may occur between the wavelength bands of the respective fluorescent lights. This overlapping area is referred to as fluorescence crosstalk.

When fluorescence crosstalk occurs, fluorescent light from other fluorescent dyes is reflected in the image of a cell that should have no fluorescent light signal, and this fluorescent light is misrecognized as a fluorescent light signal. This becomes an artifact and reduces the accuracy of image analysis.

Figure 7:
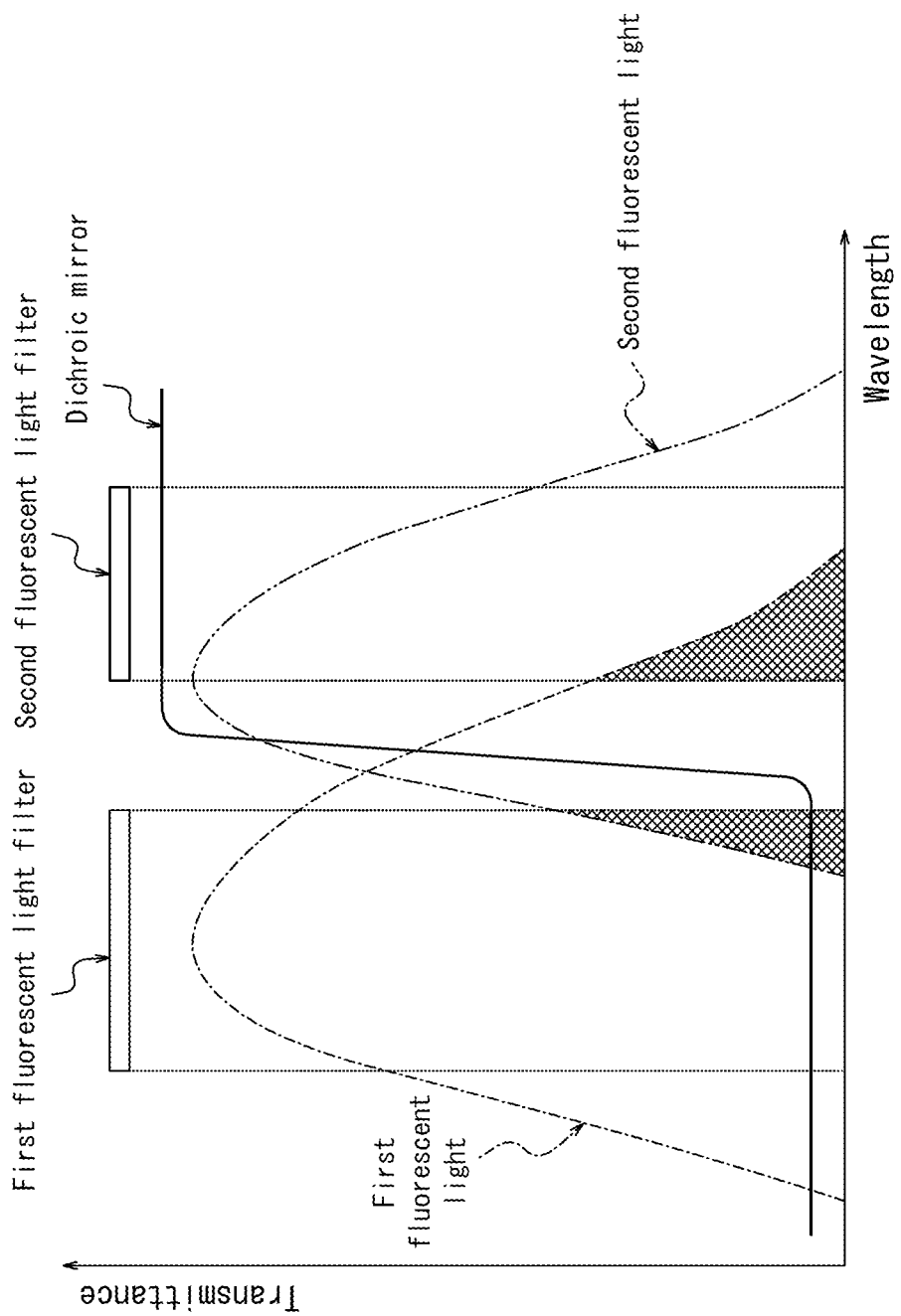
FIG. 7 is a schematic diagram illustrating fluorescence crosstalk.

FIG. 7 is a schematic diagram illustrating fluorescence crosstalk. For example, as illustrated in FIG. 7, first fluorescent light and second fluorescent light are present over a wide wavelength band. In the case of separating two types of fluorescent light, i.e., the first fluorescent light and the second fluorescent light, a dichroic mirror is used. For example, the dichroic mirror reflects the first fluorescent light and transmits the second fluorescent light. Furthermore, a first fluorescent light filter and a second fluorescent light filter are used. However, as illustrated in FIG. 7, one of the two fluorescent lights may extend into the wavelength band of the other fluorescent light filter. The area indicated by hatching in FIG. 7 represents crosstalk.

The matter described in PTL 1 aims to suppress fluorescence crosstalk. The device described in PTL 1 has two systems in a confocal scanner with a set of a pinhole array disk and a microlens array disk. With each system, the apparatus excites fluorescent dyes of different wavelengths in different parts of the sample, and the fluorescent light produced by the excitation is condensed in the respective systems. The systems of the confocal scanner are separated by wavelength. The two systems are ultimately connected to a microscope via optical elements such as a beam splitter device and a polarization device.

Figure 8A:
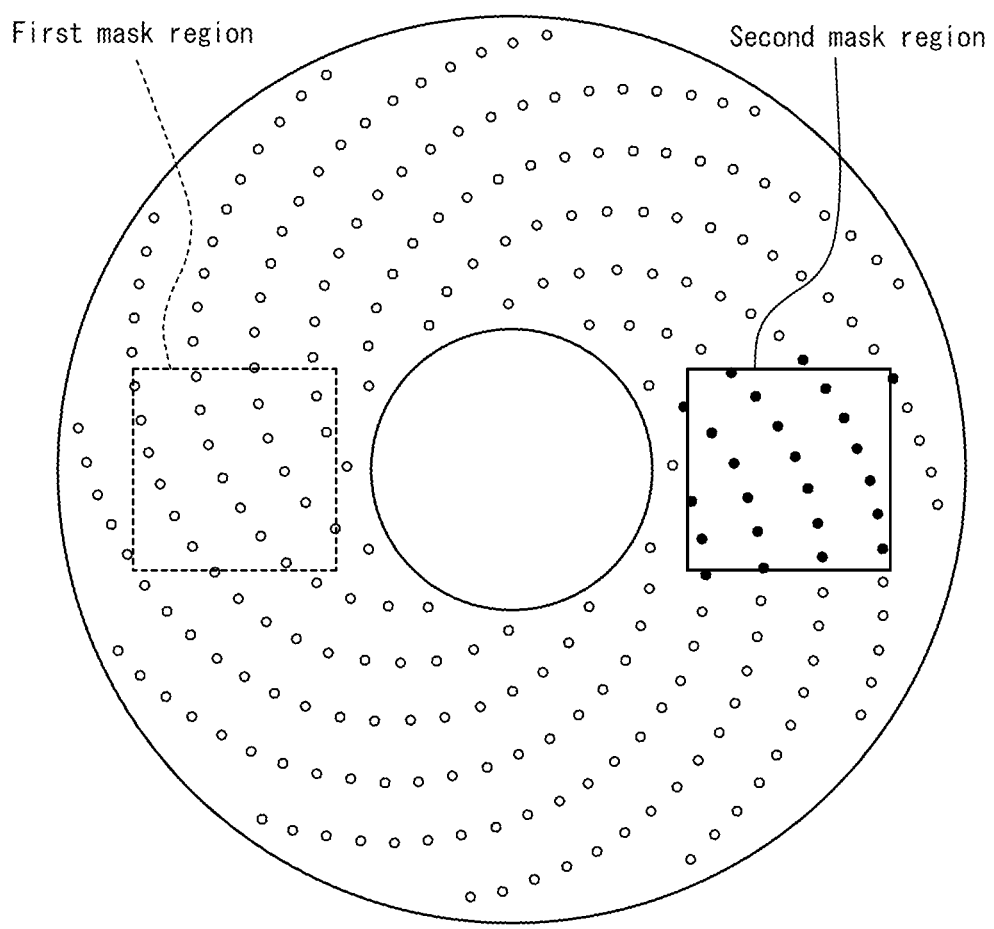
FIG. 8A is a first schematic diagram illustrating a problem with conventional technology.
Figure 8B:
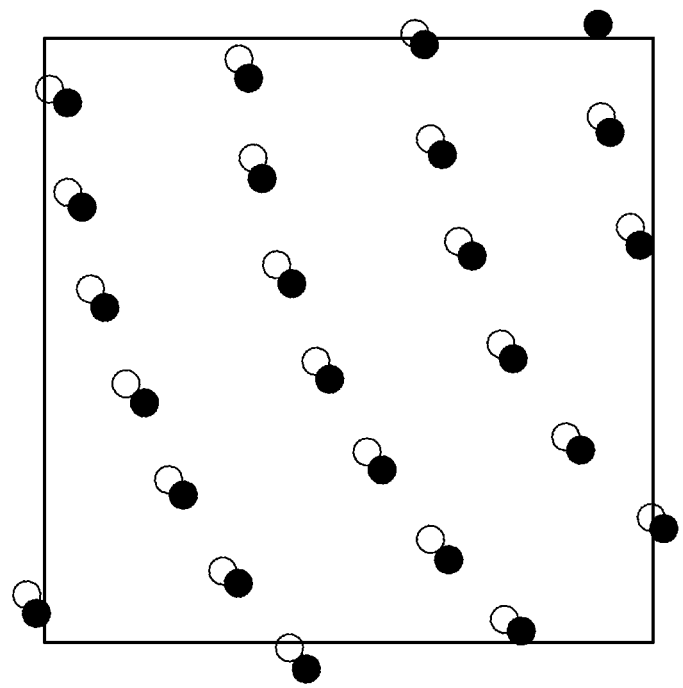
FIG. 8B is a second schematic diagram illustrating a problem with conventional technology.
Figure 8C:
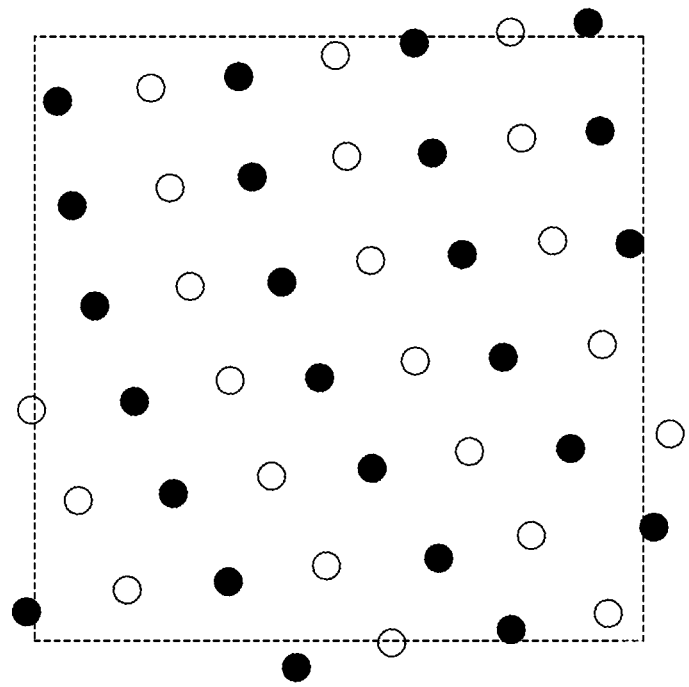
FIG. 8C is a third schematic diagram illustrating a problem with conventional technology.

FIG. 8A is a first schematic diagram illustrating a problem with conventional technology. FIG. 8B is a second schematic diagram illustrating a problem with conventional technology. FIG. 8C is a third schematic diagram illustrating a problem with conventional technology.

In the apparatus described in PTL 1, the respective scanning and excitation ranges of the two systems in the confocal scanner correspond to a first mask region and a second mask region indicated respectively by the section enclosed by a dashed line and the section enclosed by a solid line in FIG. 8A. The two areas are located on a single Nipkow disk and are scanned by identically shaped pinholes arranged in a spiral.

As illustrated in FIG. 8A, the first mask region and second mask region are in rotationally symmetrical positions with respect to each other. Since the first mask region and the second mask region are scanned by identically shaped pinholes arranged in a spiral pattern, the scanning range corresponding to the first mask region and the scanning range corresponding to the second mask region coincide perfectly in the case of connection as is to the microscope. For example, as illustrated in FIG. 8B, the scanning range corresponding to the second mask region overlaps the scanning range corresponding to the first mask region when rotated 180°. Conversely, the scanning range corresponding to the first mask region overlaps the scanning range corresponding to the second mask region when rotated 180°.

In the case of the subsequent optical system being ideally adjusted for the two systems in the confocal scanner, the pinhole image of the first mask region and the pinhole image of the second mask region will also coincide on the sample. Therefore, the two systems in the confocal scanner will excite the same region of the cell sample and will condense fluorescent light from the same region. In this case, the two systems in the confocal scanner do not function as different systems and are equivalent to a single-system confocal scanner. As a result, fluorescence crosstalk occurs.

To solve this problem, PTL 1 discloses providing a beam splitter device that deflects the illumination light passing through the first mask region and/or the illumination light passing through the second mask region. By adjustment of the installation angle of the beam splitter device, the directions of the two illumination lights are changed relative to each other, so that the scanning range corresponding to the first mask region is shifted and does not overlap with the scanning range corresponding to the second mask region. For example, as illustrated in FIG. 8C, the ranges can be prevented from overlapping by the two illumination lights being deflected relative to each other.

However, the amount of deflection is extremely small, on the order of several hundred micrometers, and precise adjustment is required with respect to the deflection of the illumination light. Therefore, it is not easy to manufacture and manage the apparatus. In addition, if the apparatus is operated for an extended period of time, changes in the deflection of the illumination light over time also pose a problem.

A confocal scanner, a confocal scanner system, and a confocal microscope system that can solve these problems are described below. Embodiments of the present disclosure are described with reference to the drawings.

The present disclosure relates to a confocal scanner in a microlens Nipkow disk-type confocal laser microscope. The present disclosure can be applied to products such as high-content analysis systems and drug discovery support devices based on confocal image analysis, for example. In the confocal laser microscope, laser light is irradiated onto a sample, such as cells, as irradiation light to excite the sample. If a fluorescent substance is fused with the cells in advance, fluorescent light is emitted from the cells when the cells receive the excitation light. A fluorescent signal is captured as an image by the microscope optical system to observe and analyze the behavior of the cells. Such microscopy techniques can be used in a wide range of fields, from basic research in biology to applied development in drug discovery. When images of cells are captured, a confocal optical system is used to obtain high-quality images without blurring. Furthermore, a microlens Nipkow disk-type confocal laser microscope has high laser light utilization efficiency and can acquire images at high speed and capture the dynamic movements of living cells in real time. Therefore, this confocal laser microscope is frequently used in live cell-based screening.

FIG. 1 is a schematic diagram illustrating an example configuration of a confocal microscope system 1 according to an embodiment. The configuration of the confocal microscope system 1 according to an embodiment is mainly described with reference to FIG. 1.

The confocal microscope system 1 has a first light source 10a and second light source 10b, a confocal scanner system 20, a microscope 30, and a first detector 40a and second detector 40b.

The first light source 10a outputs first irradiation light that enters the confocal scanner system 20 and is irradiated onto a sample S on the microscope 30. The first light source 10a includes a laser light source, for example. The wavelength of the irradiation light irradiated from the first light source 10a is, for example, included in the absorption band of the sample S and in the wavelength region where fluorescent light can be generated from the sample S. For example, the wavelength of the first irradiation light irradiated from the first light source 10a may be included in the visible region. For example, the first irradiation light may have two different wavelengths, i.e., a first wavelength and a third wavelength.

The second light source 10b outputs second irradiation light that enters the confocal scanner system 20 and is irradiated onto a sample S on the microscope 30. The second light source 10b includes a laser light source, for example. The wavelength of the irradiation light irradiated from the second light source 10b is, for example, included in the absorption band of the sample S and in the wavelength region where fluorescent light can be generated from the sample S. For example, the wavelength of the second irradiation light irradiated from the second light source 10b may be included in the visible region. For example, the second irradiation light may have two different wavelengths, i.e., a second wavelength and a fourth wavelength.

The confocal scanner system 20 has a confocal scanner 21, a first optical system Sa including a plurality of optical elements, and a second optical system Sb including a plurality of optical elements.

The confocal scanner 21 has a first pinhole array disk 211a with a plurality of first pinholes arranged in an array and a second pinhole array disk 211b with a plurality of second pinholes arranged in an array. In the confocal scanner 21 according to one embodiment, the diameter of the first pinholes and the diameter of the second pinholes may be identical or may be different from each other.

Figure 2:
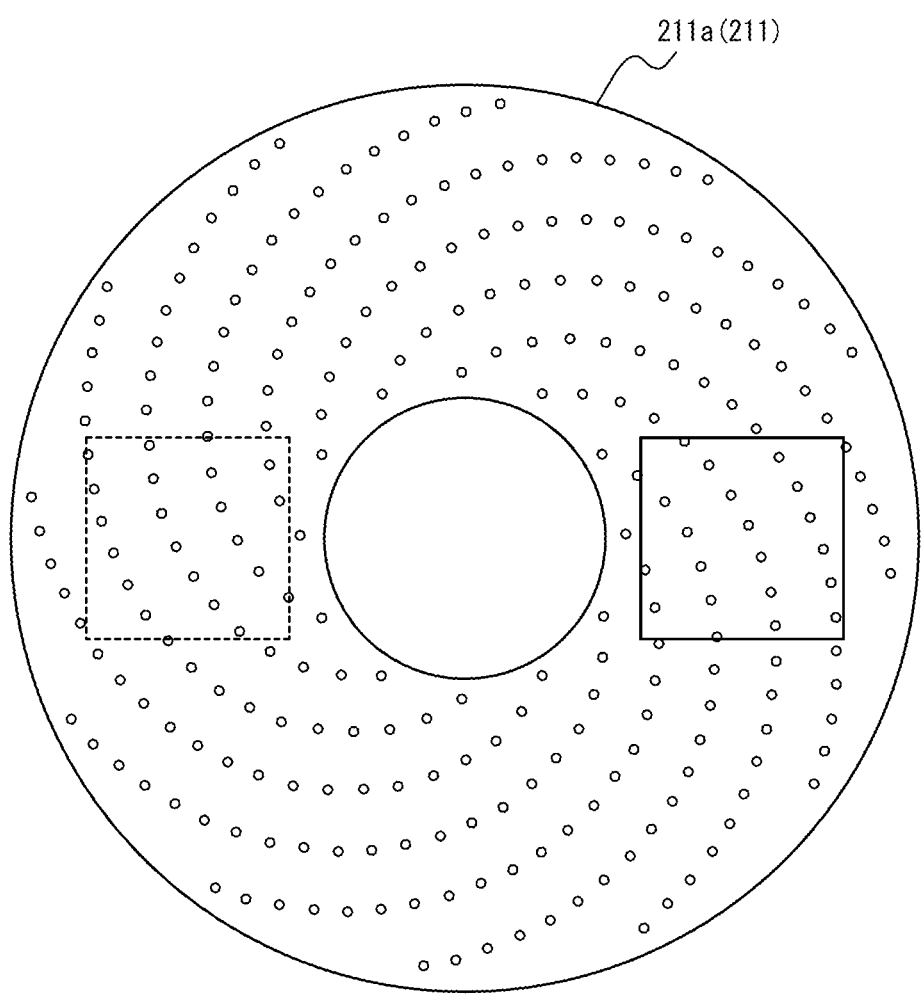
FIG. 2 is a schematic diagram of an example of a first pinhole array disk viewed from above.

FIG. 2 is a schematic diagram of an example of the first pinhole array disk 211a viewed from above. Although only the first pinhole array disk 211a is illustrated in FIG. 2, the second pinhole array disk 211b may be configured in the same manner as in FIG. 2. For example, the arrangement of the plurality of first pinholes in the first pinhole array disk 211a and the arrangement of the plurality of second pinholes in the second pinhole array disk 211b may be identical.

The plurality of first pinholes formed in the first pinhole array disk 211a are arranged at equal pitch and in a spiral in the first pinhole array disk 211a. Similarly, the plurality of second pinholes formed in the second pinhole array disk 211b are arranged at equal pitch and in a spiral in the second pinhole array disk 211b.

Referring again to FIG. 1, the confocal scanner 21 has a condensing element array disk 212 with a plurality of condensing elements arranged in an array. The condensing element array disk 212 is positioned to be sandwiched between the first pinhole array disk 211a and the second pinhole array disk 211b. The condensing elements include, for example, microlenses.

The confocal scanner 21 has a connecting shaft 213 that connects the first pinhole array disk 211a, the second pinhole array disk 211b, and the condensing element array disk 212, and a motor 214 that rotates the first pinhole array disk 211a, the second pinhole array disk 211b, and the condensing element array disk 212 together with the connecting shaft 213 in the same direction.

The first pinhole array disk 211a is attached to the connecting shaft 213 so that one first pinhole is located at a first focal plane of one condensing element in the condensing element array disk 212. The second pinhole array disk 211b is attached to the connecting shaft 213 so that one second pinhole is located at a second focal plane of one condensing element in the condensing element array disk 212.

More specifically, the microlens array in the condensing element array disk 212 has two focal planes in the vertical direction in FIG. 1. The first pinhole array disk 211a is attached at the position of the upper first focal plane. The second pinhole array disk 211b is attached at the position of the lower second focal plane. The position of each pinhole formed on the pinhole array disk 211, which includes the first pinhole array disk 211a and the second pinhole array disk 211b, and the position of each microlens formed as a condensing element on the condensing element array disk 212 are in a one-to-one relationship.

As described above, the confocal scanner 21 is a microlens pinhole array disk configured by, for example, one microlens array disk and two pinhole array disks 211 arranged to sandwich the microlens array disk. The combination of the first pinhole array disk 211a and the condensing element array disk 212 forms a first confocal scanner. Similarly, the combination of the second pinhole array disk 211b and the condensing element array disk 212 forms a second confocal scanner.

The confocal scanner 21 also has a first branching element 215a disposed between the first pinhole array disk 211a and the condensing element array disk 212 and a second branching element 215b disposed between the second pinhole array disk 211b and the condensing element array disk 212. A branching element 215 that includes the first branching element 215a and the second branching element 215b includes a dichroic mirror, for example.

The first optical system Sa includes the first confocal scanner, which is the combination of the first pinhole array disk 211a and the condensing element array disk 212. The first optical system Sa includes a dichroic mirror 22a positioned immediately before the microscope 30.

The first optical system Sa includes a plurality of mirrors 23a. For example, the first optical system Sa includes a first mirror 23a1, a second mirror 23a2, a third mirror 23a3, and a fourth mirror 23a4 arranged in this order from the first light source 10a towards the first detector 40a.

The first optical system Sa includes a plurality of lenses 24a. For example, the first optical system Sa includes a first lens 24a1, a second lens 24a2, a third lens 24a3, a fourth lens 24a4, a fifth lens 24a5, and a sixth lens 24a6 arranged in this order from the first light source 10a towards the first detector 40a.

The first optical system Sa includes a first fluorescent light filter 25a1 positioned immediately before the fifth lens 24a5. The first optical system Sa includes a second fluorescent light filter 25a2 positioned immediately before the sixth lens 24a6.

The first optical system Sa includes a dichroic mirror 26a that branches the optical path from the fourth lens 24a4 into a first optical path, in which fluorescent light based on the first wavelength passes through the first fluorescent filter 25a1 and the fifth lens 24a5, and a second optical path, in which fluorescent light based on the third wavelength passes through the second fluorescent filter 25a2 and the sixth lens 24a6.

The second optical system Sb includes the second confocal scanner, which is the combination of the second pinhole array disk 211b and the condensing element array disk 212. The second optical system Sb includes a dichroic mirror 22b positioned immediately before the microscope 30.

The second optical system Sb includes a mirror 23b. The second optical system Sb includes a plurality of lenses 24b. For example, the second optical system Sb includes a first lens 24b1, a second lens 24b2, a third lens 24b3, and a fourth lens 24b4 arranged in this order from the second light source 10b towards the second detector 40b.

The second optical system Sb includes a first fluorescent light filter 25b1 positioned immediately before the third lens 24b3. The second optical system Sb includes a second fluorescent light filter 25b2 positioned immediately before the fourth lens 24b4.

The second optical system Sb includes a dichroic mirror 26b that branches the optical path from the second lens 24b2 into a first optical path, in which fluorescent light based on the second wavelength passes through the first fluorescent filter 25b1 and the third lens 24b3, and a second optical path, in which fluorescent light based on the fourth wavelength passes through the second fluorescent filter 25b2 and the fourth lens 24b4.

The dichroic mirror 22a of the first optical system Sa and the dichroic mirror 22b of the second optical system Sb are the same dichroic mirror. In other words, the same dichroic mirror is used in common as the dichroic mirror 22a of the first optical system Sa and the dichroic mirror 22b of the second optical system Sb. In the following, the dichroic mirror 22a of the first optical system Sa and the dichroic mirror 22b of the second optical system Sb are simply referred to as the "dichroic mirror 22" when no distinction is made therebetween.

The microscope 30 includes, for example, any microscope that can be used to observe the sample S. The sample S that is irradiated with the first irradiation light from the first light source 10a and the second irradiation light from the second light source 10b is contained in the microscope 30. The microscope 30 has a set of an imaging lens 31 and an objective lens 32 that ultimately condense the first irradiation light irradiated from the first light source 10a and the second irradiation light irradiated from the second light source 10b onto the sample S.

The first detector 40a detects fluorescent light, from the sample S on the microscope 30, as first light to be measured based on the first irradiation light. The first detector 40a includes a camera, for example. Such a camera has an appropriate photosensitivity in the wavelength band of the fluorescent light emitted from the sample S. For example, the first detector 40a may have an appropriate photosensitivity in the visible region. For example, the first detector 40a includes a pair of a first detector 40a1 and a first detector 40a2 that respectively detect first light to be measured based on the first wavelength and the third wavelength of the first irradiation light.

The second detector 40b detects fluorescent light, from the sample S on the microscope 30, as second light to be measured based on the second irradiation light. The second detector 40b includes a camera, for example. Such a camera has an appropriate photosensitivity in the wavelength band of the fluorescent light emitted from the sample S. For example, the second detector 40b may have an appropriate photosensitivity in the visible region. For example, the second detector 40b includes a pair of a second detector 40b1 and a second detector 40b2 that respectively detect second light to be measured based on the second wavelength and the fourth wavelength of the second irradiation light.

Figure 3:
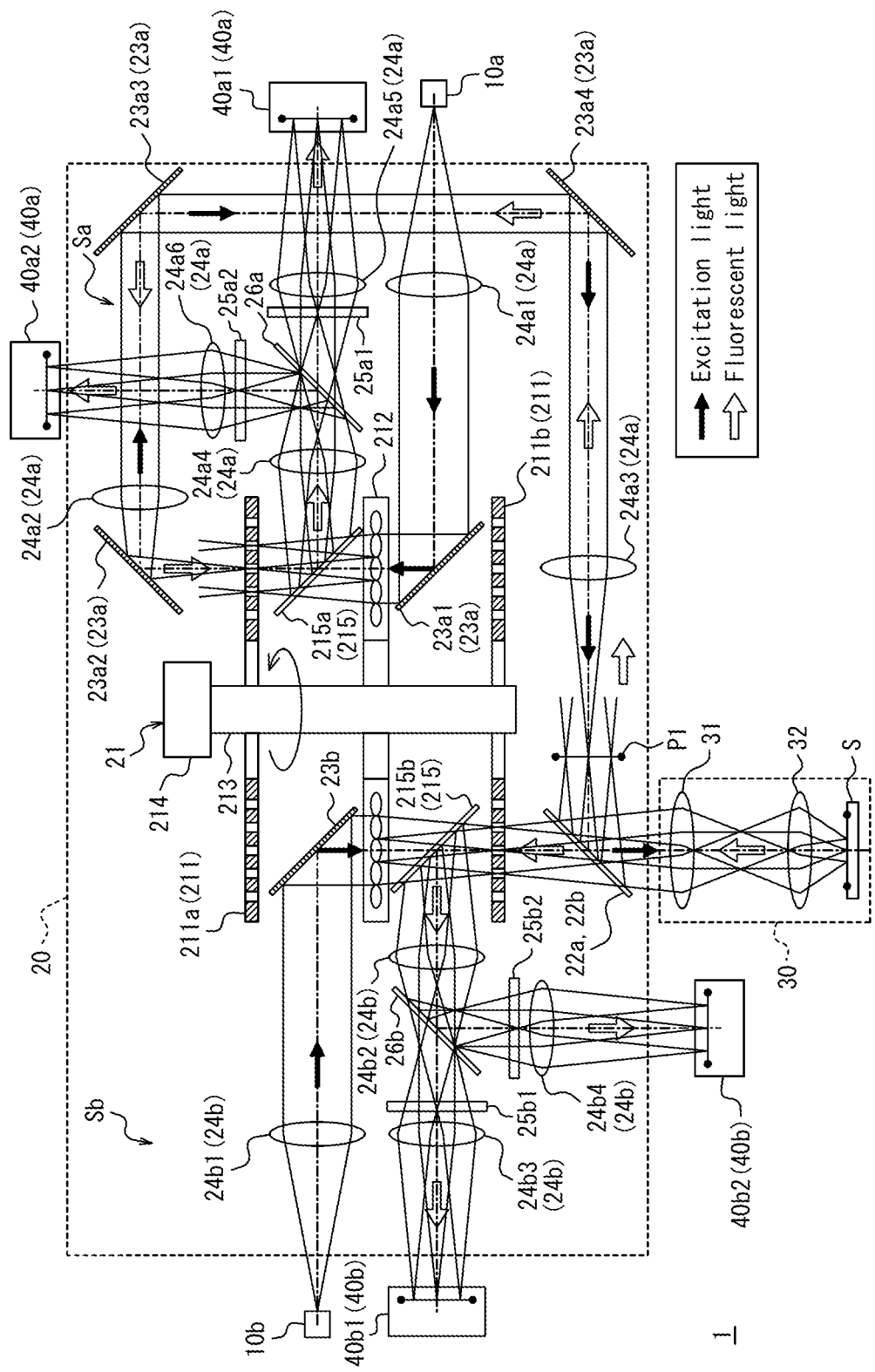
FIG. 3 is a schematic diagram, corresponding to FIG. 1, illustrating an example configuration of the confocal microscope system along with the propagation of light.

FIG. 3 is a schematic diagram, corresponding to FIG. 1, illustrating an example configuration of the confocal microscope system 1 along with the propagation of light. The function of the confocal microscope system 1 is mainly described with reference to FIG. 3.

First, the function of the first optical system Sa is mainly described. The first optical system Sa guides the first irradiation light through the first confocal scanner to the microscope 30 containing the sample S and guides the first light to be measured based on the first irradiation light, i.e., the fluorescent light, from the sample S to the first detector 40*a*, the first light to be measured contributing to a first confocal image.

For example, the confocal microscope system 1 includes a system in which the first confocal scanner in the first optical system Sa is used to capture fluorescent light of two wavelengths based on the first irradiation light of two wavelengths, i.e., the first wavelength and the third wavelength. In the case of two colors, lasers of two wavelengths are combined in the first light source 10*a*. In addition, in the optical path of the fluorescent light in the first optical system Sa, the fluorescent lights of different wavelengths are separated by the dichroic mirror 26*a*.

The first irradiation light outputted from the first light source 10*a* while spreading is converted to parallel light by the first lens 24*a*1 of the first optical system Sa in the confocal scanner system 20. That is, the first lens 24*a*1 functions as a collimating lens. The collimated first irradiation light is then reflected by the first mirror 23*a*1 and is incident on the condensing element array disk 212 of the confocal scanner 21.

The first irradiation light that has passed through the microlenses arranged on the condensing element array disk 212 is transmitted by the first branching element 215*a* and converges at the focal point of each microlens. The first irradiation light converged at the focal point of each microlens passes through the first pinholes of the first pinhole array disk 211*a*, which is disposed at the position of the first focal plane of the microlenses. As indicated by the section enclosed by a solid line in FIG. 2, the first irradiation light converged at the focal point of each microlens may, for example, be irradiated on a predetermined area of the first pinhole array disk 211*a* located in the 3 o'clock direction when viewed from above.

As illustrated in FIG. 3, the first irradiation light, which became numerous point light sources at the first pinhole array disk 211*a*, is reflected by the second mirror 23*a*2, the third mirror 23*a*3, the fourth mirror 23*a*4, and the dichroic mirror 22*a* and is incident on the microscope 30. At this time, the first irradiation light, which became numerous point light sources at the first pinhole array disk 211*a*, is relayed to an image plane P1 of the microscope 30 by the second lens 24*a*2 and the third lens 24*a*3 in the optical path. In other words, the second lens 24*a*2 and the third lens 24*a*3 function as a set of relay lenses that connect the pinhole surface of the first pinhole array disk 211*a* and the image plane P1 of the microscope 30 in a conjugate relationship.

The dichroic mirror 22*a* reflects the first irradiation light that passes through the first confocal scanner and the fluorescent light from the sample S excited by the first irradiation light and transmits the second irradiation light that passes through the second confocal scanner, described below, and the fluorescent light from the sample S excited by the second irradiation light.

The numerous point light sources formed by the first pinhole array disk 211*a* are focused into a point image at the sample S by the imaging lens 31 and the objective lens 32 in the microscope 30 and excite the sample S. At this time, the sample S is excited at both the first wavelength and the third wavelength based on the first irradiation light that has the first wavelength and the third wavelength. By rotation of the motor 214 of the confocal scanner 21, the numerous point light sources scan the entire surface of the sample S, making it possible to obtain two-dimensional image information.

Fluorescent light based on the first wavelength and the third wavelength is emitted from the sample S excited by the numerous point light sources. Such fluorescent light follows a reverse optical path, yielding a fluorescent image at the image plane P1 of the microscope 30. The fluorescent light is reflected by the fourth mirror 23*a*4, the third mirror 23*a*3, and the second mirror 23*a*2 and is relayed to the pinhole surface of the first pinhole array disk 211*a* by the third lens 24*a*3 and the second lens 24*a*2 in the optical path. The fluorescent light becomes the first confocal image as a result of rotational scanning of the first pinholes.

The pinhole image of the first pinhole array disk 211*a*, i.e., the first confocal image, is reflected by the dichroic mirror of the first branching element 215*a*, which has the properties of transmitting the first irradiation light and reflecting the corresponding fluorescent light. The first confocal image based on the first wavelength is transmitted by the dichroic mirror 26*a* and is relayed to a light-receiving surface of the first detector 40*a*1 by the fourth lens 24*a*4 and the fifth lens 24*a*5 in the optical path. In other words, the fourth lens 24*a*4 and the fifth lens 24*a*5 function as a set of relay lenses that connect the pinhole surface of the first pinhole array disk 211*a* and the light-receiving surface of the first detector 40*a*1 in a conjugate relationship.

The first confocal image is captured as an image by the camera of the first detector 40*a*1 via the first fluorescent light filter 25*a*1 immediately before the fifth lens 24*a*5. The first fluorescent light filter 25*a*1 transmits only fluorescent light, based on the first wavelength, that contains information on the sample S to be observed.

The first confocal image based on the third wavelength is reflected by the dichroic mirror 26*a* and is relayed to a light-receiving surface of the first detector 40*a*2 by the fourth lens 24*a*4 and the sixth lens 24*a*6 in the optical path. In other words, the fourth lens 24*a*4 and the sixth lens 24*a*6 function as a set of relay lenses that connect the pinhole surface of the first pinhole array disk 211*a* and the light-receiving surface of the first detector 40*a*2 in a conjugate relationship.

The first confocal image is captured as an image by the camera of the first detector 40*a*2 via the second fluorescent light filter 25*a*2 immediately before the sixth lens 24*a*6. The second fluorescent light filter 25*a*2 transmits only fluorescent light, based on the third wavelength, that contains information on the sample S to be observed.

Next, the function of the second optical system Sb is mainly described. The second optical system Sb guides the second irradiation light through the second confocal scanner to the microscope 30 containing the sample S and guides the second light to be measured based on the second irradiation light, i.e., the fluorescent light, from the sample S to the second detector 40*b*, the second light to be measured contributing to a second confocal image.

For example, the confocal microscope system 1 includes a system in which the second confocal scanner in the second optical system Sb is used to capture fluorescent light of two wavelengths based on the second irradiation light of two wavelengths, i.e., the second wavelength and the fourth wavelength. In the case of two colors, lasers of two wavelengths are combined in the second light source 10*b*. In addition, in the optical path of the fluorescent light in the second optical system Sb, the fluorescent lights of different wavelengths are separated by the dichroic mirror 26*b*.

The second irradiation light outputted from the second light source 10*b* while spreading is converted to parallel light by the first lens 24*b*1 of the second optical system Sb in the confocal scanner system 20. That is, the first lens 24*b*1 functions as a collimating lens. The collimated second irradiation light is then reflected by the mirror 23*b* and is incident on the condensing element array disk 212 of the confocal scanner 21.

The second irradiation light that has passed through the microlenses arranged on the condensing element array disk 212 is transmitted by the second branching element 215*b* and converges at the focal point of each microlens. The second irradiation light converged at the focal point of each microlens passes through the second pinholes of the second pinhole array disk 211*b*, which is disposed at the position of the second focal plane of the microlenses. As indicated by the section enclosed by a dashed line in FIG. 2, the second irradiation light converged at the focal point of each microlens may, for example, be irradiated on a predetermined area of the second pinhole array disk 211*b* located in the 9 o'clock direction when viewed from above.

As illustrated in FIG. 3, the second irradiation light, which became numerous point light sources at the second pinhole array disk 211*b*, is transmitted by the dichroic mirror 22*b* and is incident on the microscope 30. The numerous point light sources formed by the second pinhole array disk 211*b* are focused into a point image at the sample S by the imaging lens 31 and the objective lens 32 in the microscope 30 and excite the sample S. At this time, the sample S is excited at both the second wavelength and the fourth wavelength based on the second irradiation light that has the second wavelength and the fourth wavelength. By rotation of the motor 214 of the confocal scanner 21, the numerous point light sources scan the entire surface of the sample S, making it possible to obtain two-dimensional image information.

The dichroic mirror 22*b* is an optical element for combining the first irradiation light that passes through the first confocal scanner and the second irradiation light that passes through the second confocal scanner and for separating the fluorescent light coming from the sample S excited by the first irradiation light from the fluorescent light coming from the sample S excited by the second irradiation light. The dichroic mirror 22*b* reflects the first irradiation light that passes through the above-described first confocal scanner and the fluorescent light from the sample S excited by the first irradiation light and transmits the second irradiation light that passes through the second confocal scanner and the fluorescent light from the sample S excited by the second irradiation light.

Fluorescent light based on the second wavelength and the fourth wavelength is emitted from the sample S excited by the numerous point light sources. Such fluorescent light follows a reverse optical path and is incident on the pinhole surface of the second pinhole array disk 211*b*. The fluorescent light becomes the second confocal image as a result of rotational scanning of the second pinholes.

The pinhole image of the second pinhole array disk 211*b*, i.e., the second confocal image, is reflected by the dichroic mirror of the second branching element 215*b*, which has the properties of transmitting the second irradiation light and reflecting the corresponding fluorescent light. The second confocal image based on the second wavelength is transmitted by the dichroic mirror 26*b* and is relayed to a light-receiving surface of the second detector 40*b*1 by the second lens 24*b*2 and the third lens 24*b*3 in the optical path. In other words, the second lens 24*b*2 and the third lens 24*b*3 function as a set of relay lenses that connect the pinhole surface of the second pinhole array disk 211*b* and the light-receiving surface of the second detector 40*b*1 in a conjugate relationship.

The second confocal image is captured as an image by the camera of the second detector 40*b*1 via the first fluorescent light filter 25*b*1 immediately before the third lens 24*b*3. The first fluorescent light filter 25*b*1 transmits only fluorescent light, based on the second wavelength, that contains information on the sample S to be observed.

The second confocal image based on the fourth wavelength is reflected by the dichroic mirror 26*b* and is relayed to a light-receiving surface of the second detector 40*b*2 by the second lens 24*b*2 and the fourth lens 24*b*4 in the optical path. In other words, the second lens 24*b*2 and the fourth lens 24*b*4 function as a set of relay lenses that connect the pinhole surface of the second pinhole array disk 211*b* and the light-receiving surface of the second detector 40*b*2 in a conjugate relationship.

The second confocal image is captured as an image by the camera of the second detector 40*b*2 via the second fluorescent light filter 25*b*2 immediately before the fourth lens 24*b*4. The second fluorescent light filter 25*b*2 transmits only fluorescent light, based on the fourth wavelength, that contains information on the sample S to be observed.

As described above, the confocal scanner 21 with two systems is achieved by a set of rotating disk units. The diameter of the first pinholes in the first confocal scanner may be determined based on the wavelength of the first irradiation light. The diameter of the second pinholes in the second confocal scanner may be determined based on the wavelength of the second irradiation light. For example, the wavelength of the first irradiation light and the wavelength of the second irradiation light are different from each other. Accordingly, the diameter of the first pinholes and the diameter of the second pinholes may be different from each other. For example, the pinhole diameters in the two-system confocal scanner may be designed to be different values in proportion to the wavelength of the irradiation light. More specifically, the pinhole diameter may be designed to be smaller as the wavelength of the irradiation light becomes shorter, and the pinhole diameter may be designed to be larger as the wavelength of the irradiation light becomes longer.

Figure 4:
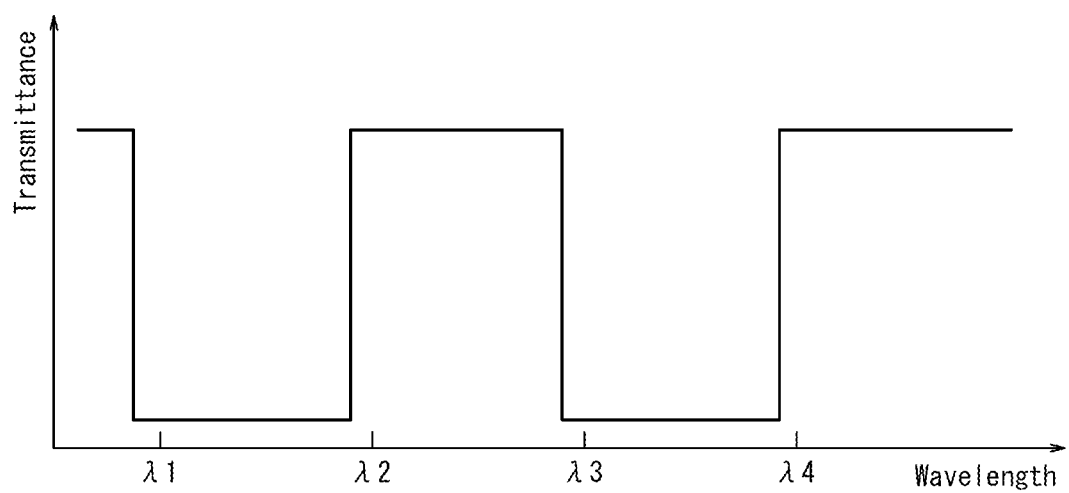
FIG. 4 is a schematic diagram illustrating wavelength characteristics of a dichroic mirror used in common in the first optical system and second optical system.

FIG. 4 is a schematic diagram illustrating wavelength characteristics of the dichroic mirror 22 used in common in the first optical system Sa and the second optical system Sb. In FIG. 4, $\lambda 1$, $\lambda 2$, $\lambda 3$, and $\lambda 4$ respectively correspond to the first wavelength of the first irradiation light, the second wavelength of the second irradiation light, the third wavelength of the first irradiation light, and the fourth wavelength of the second irradiation light. For example, the wavelengths increase in the order of the first wavelength $\lambda 1$, the second wavelength $\lambda 2$, the third wavelength $\lambda 3$, and the fourth wavelength $\lambda 4$.

For example, the dichroic mirror 22 reflects the first irradiation light that has passed through the first confocal scanner and has the first wavelength $\lambda 1$ and the third wavelength $\lambda 3$. The dichroic mirror 22 reflects the fluorescent light from the sample S excited by the first irradiation light. For example, the fluorescent light based on the first wavelength $\lambda 1$ is emitted over a wide wavelength band on the longer wavelength side of the first wavelength $\lambda 1$. For example, the fluorescent light based on the third wavelength $\lambda 3$ is emitted over a wide wavelength band on the longer wavelength side of the third wavelength $\lambda 3$.

For example, the dichroic mirror 22 transmits the second irradiation light that has passed through the second confocal scanner and has the second wavelength $\lambda 2$ and the fourth wavelength $\lambda 4$. The dichroic mirror 22 transmits the fluorescent light from the sample S excited by the second irradiation light. For example, the fluorescent light based on the second wavelength λ2 is emitted over a wide wavelength band on the longer wavelength side of the second wavelength λ2. For example, the fluorescent light based on the fourth wavelength λ4 is emitted over a wide wavelength band on the longer wavelength side of the fourth wavelength λ4.

The optical systems are separated for two wavelengths near each other, for example, the first wavelength λ1 and the second wavelength λ2, using different systems of the confocal scanner 21, such as the first confocal scanner and the second confocal scanner. Fluorescence crosstalk is thereby suppressed.

Figure 5:
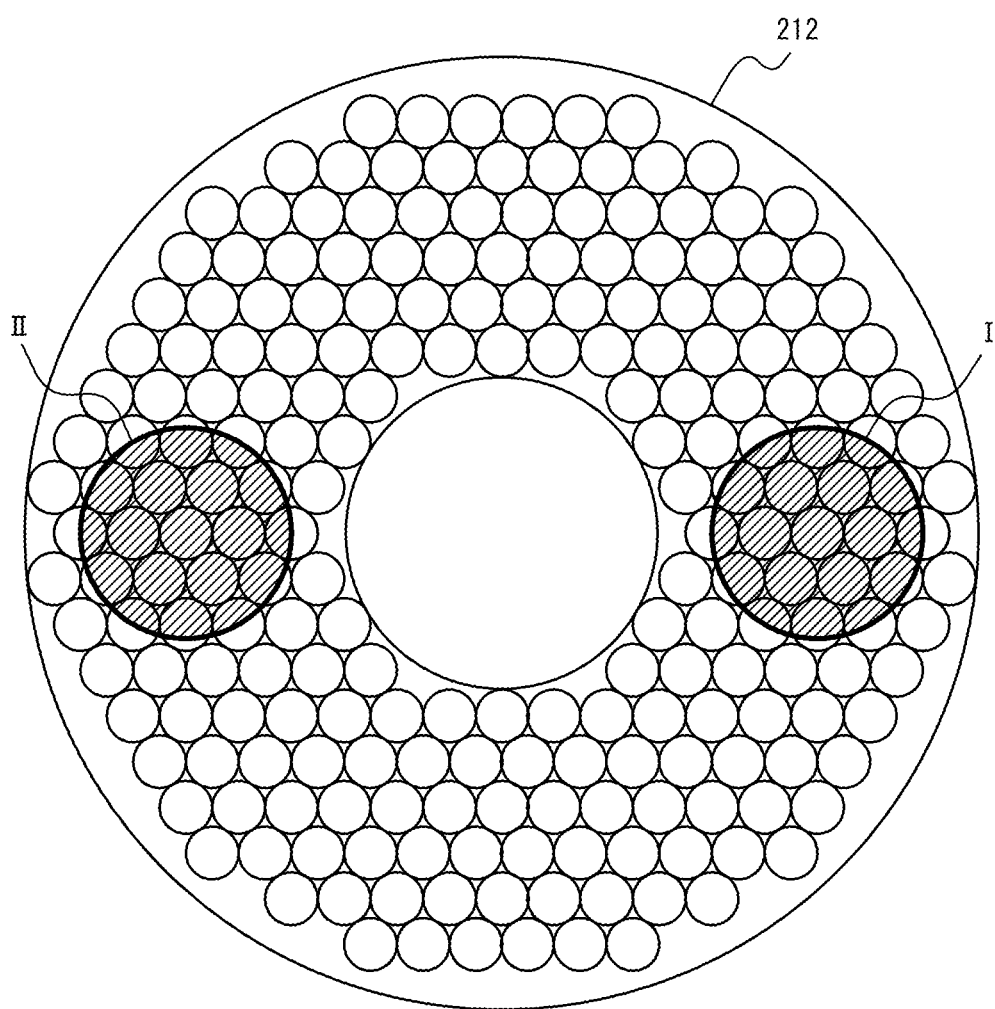
FIG. 5 is a schematic diagram of an example of a condensing element array disk viewed from above.

FIG. 5 is a schematic diagram of an example of the condensing element array disk 212 viewed from above. FIG. 5 illustrates the state of the condensing element array disk 212 when viewed from the same direction as the first pinhole array disk 211a in FIG. 2.

As illustrated in FIG. 5, numerous microlenses are arranged in an array in the condensing element array disk 212. When the first irradiation light is irradiated onto the condensing element array disk 212 in the first optical system Sa described above using FIG. 3, the first irradiation light may be irradiated on a predetermined area of the condensing element array disk 212 located in the 3 o'clock direction when viewed from above, as indicated by the section I enclosed by a solid line in FIG. 5. On the other hand, when the second irradiation light is irradiated onto the condensing element array disk 212 in the second optical system Sb described above using FIG. 3, the second irradiation light may be irradiated on a predetermined area of the condensing element array disk 212 located in the 9 o'clock direction when viewed from above, as indicated by the section II enclosed by a solid line in FIG. 5.

According to one embodiment described above, it is possible to suppress crosstalk between the lights to be measured without requiring precise adjustments to the optical system. For example, the confocal scanner 21 does not require an optical element, as in conventional technology, that defects the direction of the irradiation light so that the excitation sites on the sample S by the first confocal scanner and the second confocal scanner do not overlap. The confocal scanner 21 does not require highly precise mechanism adjustment as in conventional technology, and by using the two pinhole array disks 211, the confocal scanner 21 can, with the discs themselves, suppress the overlap of excitation sites on the sample S by the first confocal scanner and the second confocal scanner. Accordingly, the assembly and adjustment of the apparatus are easy, and robustness of the apparatus is easily achieved.

For example, the confocal scanner 21 achieves a two-system confocal scanner using a set of rotating disk units yielded by combining the first pinhole array disk 211a and the second pinhole array disk 211b with the condensing element array disk 212. The confocal scanners enable wavelength-specific confocal imaging. With the two-system confocal scanner, different sites on the sample S are excited by irradiation light with different wavelengths, and the resulting wavelength-specific fluorescent light is divided and condensed by the two-system confocal scanner. The excitation sites thus differ by wavelength, making it difficult for fluorescent light of different wavelengths to be produced from the same site. At this time, the direction of rotation of the first pinholes in the first confocal scanner and the direction of rotation of the second pinholes in the second confocal scanner have their own characteristics.

In the confocal scanner 21, two pinhole array disks, i.e., the first pinhole array disk 211a and the second pinhole array disk 211b, are arranged vertically to sandwich the condensing element array disk 212. Therefore, when the pinhole array disks are viewed from the respective propagation directions of the first irradiation light and the second irradiation light, one rotates clockwise and the other counterclockwise. The confocal scans in the first confocal scanner and the second confocal scanner are thus not synchronized with each other but rather are performed independently. As a result, a first fluorescent image based on the first confocal scanner and a second fluorescent image based on the second confocal scanner do not overlap, and fluorescence crosstalk is sufficiently suppressed. Highly accurate image analysis can therefore be achieved.

In other words, the site on the sample S excited by the first confocal scanner and the site on the sample S excited by the second confocal scanner differ from each other at the same time. This helps to prevent the fluorescent lights from the two sites from being condensed at the respective confocal points and mixing. Therefore, the wavelength of the first light to be measured and the wavelength of the second light to be measured do not overlap at the same time, and fluorescence crosstalk is sufficiently suppressed.

Figure 6A:
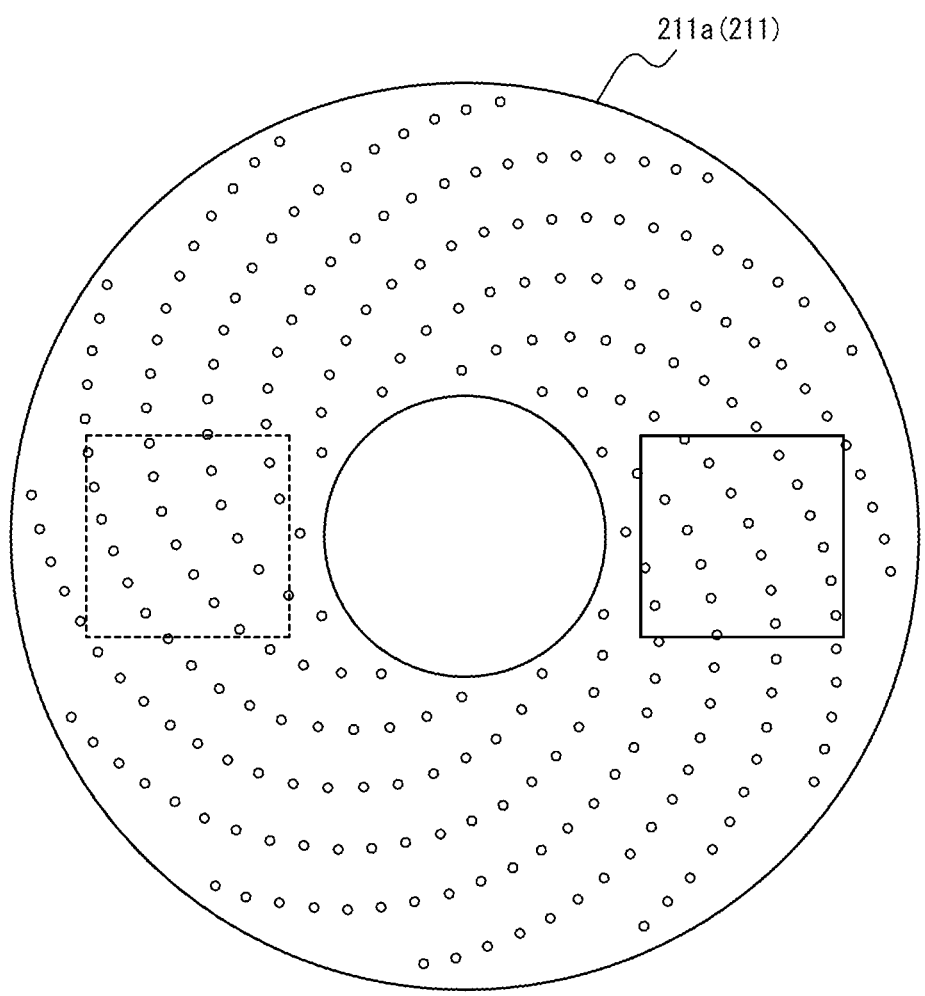
FIG. 6A is a schematic diagram of an example of a first pinhole array disk viewed from above.
Figure 6B:
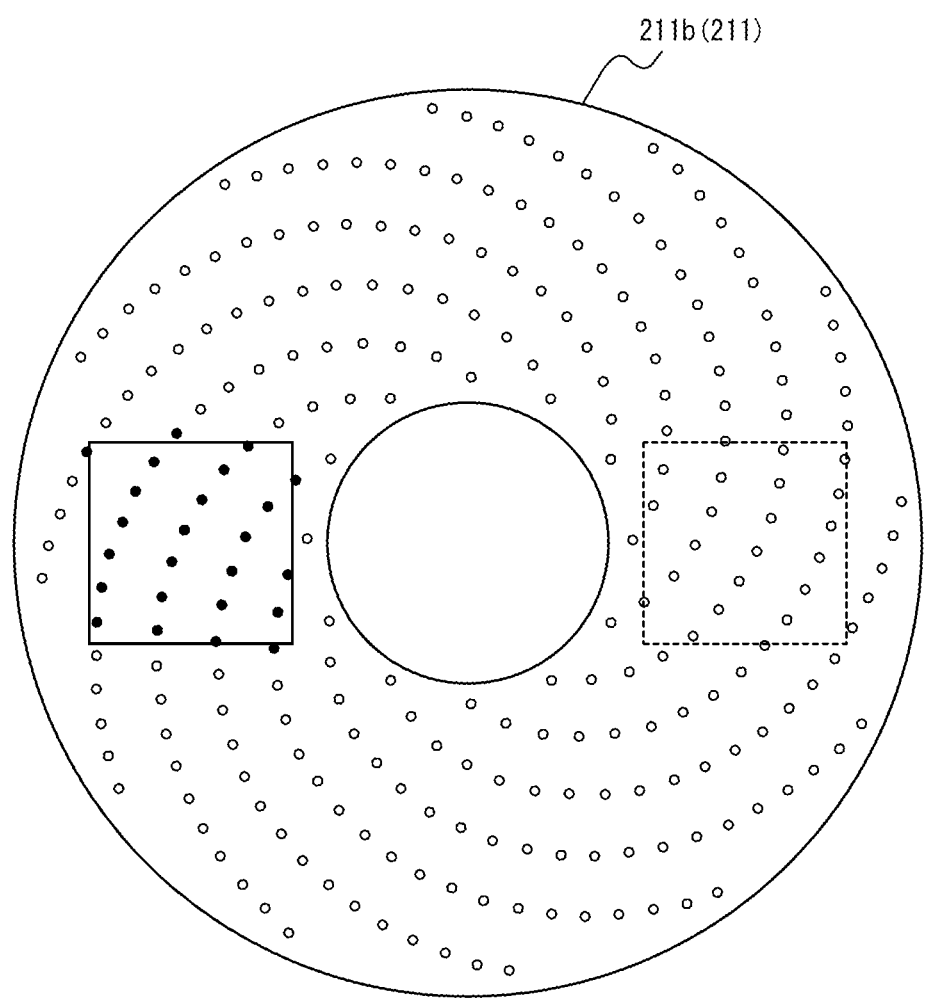
FIG. 6B is a schematic diagram of an example of a second pinhole array disk viewed from below.

FIG. 6A is a schematic diagram of an example of the first pinhole array disk 211a viewed from above. FIG. 6A is a reproduction of FIG. 2 for the sake of explaining the effects of the present disclosure in contrast with FIGS. 6B and 6C. FIG. 6A is a view of the first pinhole array disk 211a from the direction of propagation of the first irradiation light on the side where the first irradiation light is emitted from the first confocal scanner. FIG. 6B is a schematic diagram of an example of the second pinhole array disk 211b viewed from below. FIG. 6B is a view of the second pinhole array disk 211b from the direction of propagation of the second irradiation light on the side where the second irradiation light is emitted from the second confocal scanner.

In the present disclosure, as illustrated in FIGS. 6A and 6B, a first region corresponding to the first mask region and a second region corresponding to the second mask region described above with reference to conventional technology are on different pinhole array disks 211. For example, as indicated by the section enclosed by a solid line in FIG. 6A, the first region is on the first pinhole array disk 211a in the 3 o'clock direction. For example, as indicated by the section enclosed by a solid line in FIG. 6B, the second region is on the second pinhole array disk 211b in the 9 o'clock direction.

Comparing FIGS. 6A and 6B, the arrangement of the first pinholes in the first region and the arrangement of the second pinholes in the second region are in an inverse relationship. Therefore, the arrangement of the first pinholes in the first region and the arrangement of the second pinholes in the second region are not rotationally symmetric with respect to each other and do not overlap due to rotation.

Figure 6C:
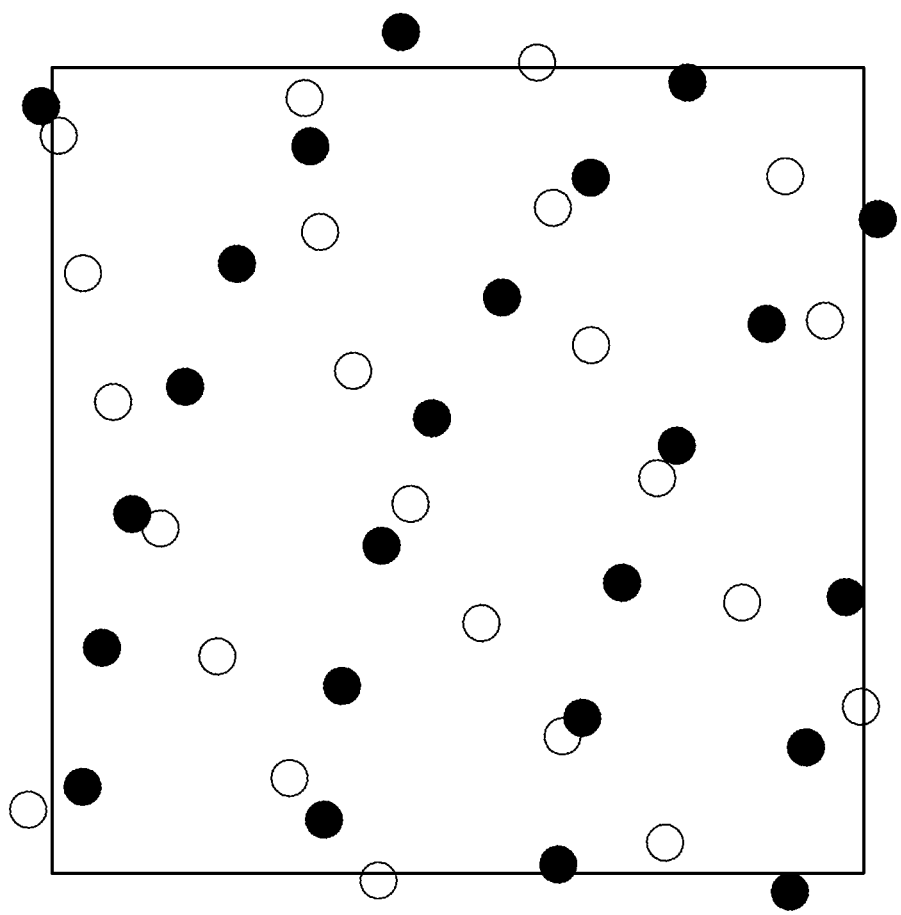
FIG. 6C is a schematic diagram illustrating the effects of the present disclosure.

FIG. 6C is a schematic diagram illustrating the effects of the present disclosure. As illustrated in FIG. 6C, even when the first region and the second region overlap due to rotation, overlap between the first pinholes and the second pinholes is suppressed.

By including the first branching element 215a, the confocal scanner 21 can separate the optical path of the first irradiation light coming from the first light source 10a and the optical path of the fluorescent light coming from the sample S on the microscope 30. Similarly, by including the second branching element 215b, the confocal scanner 21 can separate the optical path of the second irradiation light coming from the second light source 10*b* and the optical path of the fluorescent light coming from the sample S on the microscope 30.

The plurality of first pinholes is arranged in the first pinhole array disk 211*a* at equal pitch and in a spiral. The plurality of second pinholes is arranged in the second pinhole array disk 211*b* at equal pitch and in a spiral. With this configuration, the confocal scanner 21 can scan a sample S on the microscope 30 at high speed with the irradiation light from the light source in both the first confocal scanner and the second confocal scanner.

The arrangement of the plurality of first pinholes in the first pinhole array disk 211*a* and the arrangement of the plurality of second pinholes in the second pinhole array disk 211*b* are identical, which further facilitates design of the confocal scanner 21.

The first optical system Sa in the confocal scanner system 20 includes the second lens 24*a*2 and the third lens 24*a*3 as a first set of relay lenses. The first optical system Sa includes the fourth lens 24*a*4 and the fifth lens 24*a*5, or the fourth lens 24*a*4 and the sixth lens 24*a*6, as a second set of relay lenses. This enables the proper construction of an optical system while maintaining the conjugate relationship between the pinhole surface of the first pinhole array disk 211*a*, the image plane P1 of the microscope 30, and the light-receiving surface of the first detector 40*a*.

The diameter of the first pinholes is determined based on the wavelength of the first irradiation light, and the diameter of the second pinholes is determined based on the wavelength of the second irradiation light. By designing the pinhole diameters in proportion to the wavelength of the irradiation light, the transmittance and confocality of the irradiation light become equal to each other for different pinhole array disks 211, and a balanced confocal image can be obtained.

By the first light source 10*a* irradiating the first irradiation light having the first wavelength and the third wavelength, and the second light source 10*b* irradiating the second irradiation light having the second wavelength and the fourth wavelength, the confocal microscope system 1 can obtain confocal images by imaging in four colors.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the shape, arrangement, orientation, and number of the above-described components are not limited to the above explanation or the drawings. The shape, arrangement, orientation, and number of each component may be selected freely as long as the functions of the component can be achieved.

In the above embodiment, the confocal scanner 21 has been described as including the first branching element 215*a* and the second branching element 215*b*, but this example is not limiting. The confocal scanner 21 may instead include only one of the first branching element 215*a* and the second branching element 215*b*, or both branching elements may be omitted. For example, the first branching element 215*a* may be disposed at any location in the first optical system Sa after the fluorescent light emitted from the sample S on the microscope 30 has passed through the first pinhole array disk 211*a* and the condensing element array disk 212. For example, the second branching element 215*b* may be disposed at any location in the second optical system Sb after the fluorescent light emitted from the sample S on the microscope 30 has passed through the second pinhole array disk 211*b* and the condensing element array disk 212.

In the above embodiment, the branching element 215 has been described as including a dichroic mirror, for example, but this example is not limiting. The branching element 215 may include any element that, for example, transmits the irradiation light from each light source and reflects the fluorescent light from the sample S on the microscope 30. For example, the branching element 215 may include a beam splitter.

In the above embodiment, the plurality of first pinholes has been described as being arranged in the first pinhole array disk 211*a* at equal pitch and in a spiral, and the plurality of second pinholes has been described as being arranged in the second pinhole array disk 211*b* at equal pitch and in a spiral, but this example is not limiting. The plurality of first pinholes may be arranged in the first pinhole array disk 211*a* in any state. The plurality of second pinholes may be arranged in the second pinhole array disk 211*b* in any state.

In the above embodiment, the arrangement of the plurality of first pinholes in the first pinhole array disk 211*a* and the arrangement of the plurality of second pinholes in the second pinhole array disk 211*b* have been described as being identical, but this example is not limiting. The arrangement of the plurality of first pinholes in the first pinhole array disk 211*a* and the arrangement of the plurality of second pinholes in the second pinhole array disk 211*b* may differ from each other.

In the above embodiment, the first optical system Sa has been described as including a plurality of sets of relay lenses, but this example is not limiting. Instead of the first optical system Sa, the second optical system Sb may include such a plurality of sets of relay lenses. The first optical system Sa and the second optical system Sb may be configured in any way that enables clear acquisition of both the first confocal image and the second confocal image for the sample S on the microscope 30.

In the above embodiment, the diameter of the first pinholes has been described as being determined based on the wavelength of the first irradiation light, and the diameter of the second pinholes as being determined based on the wavelength of the second irradiation light, but this example is not limiting. The diameter of the pinholes may be constant, regardless of the wavelength of the irradiation light.

In the above embodiment, the first irradiation light has been described as having two different wavelengths, the first wavelength and the third wavelength, and the second irradiation light as having two different wavelengths, the second wavelength and the fourth wavelength, but this example is not limiting. Each irradiation light may have only one wavelength or may have three or more wavelengths.

In the above embodiment, the first light source 10*a* and the second light source 10*b* have each been described as including a laser light source, for example, but this example is not limiting. Each light source may include any light source that enables acquisition of the first confocal image and the second confocal image. For example, each light source may include a light emitting diode (LED). In the above embodiment, the wavelength of the irradiation light irradiated from each light source has been described as being included in the visible region, but this example is not limiting. For example, the wavelength of the irradiation light irradiated from each light source may be included in the ultraviolet and infrared regions or the like.

In the above embodiment, the condensing elements forming the condensing element array disk 212 have been described as including microlenses, but this example is not limiting. Such condensing elements may include any element capable of condensing the irradiation light from each light source at the position of the first pinhole array disk 211a and the second pinhole array disk 211b.

In the above embodiment, as illustrated in FIGS. 2 and 5, the irradiation light or the fluorescent light has been described as being incident on a predetermined area of the first pinhole array disk 211a, the second pinhole array disk 211b, and the condensing element array disk 212 located in the 3 o'clock or the 9 o'clock direction when viewed from above, but this example is not limiting. The area on which the irradiation light or fluorescent light is incident may be arranged in any relationship between the first optical system Sa and the second optical system Sb.

The invention claimed is:

1. A confocal scanner comprising:
a first pinhole array disk in which a plurality of first pinholes is arranged in an array;
a second pinhole array disk in which a plurality of second pinholes is arranged in an array;
a condensing element array disk, on which a plurality of condensing elements is arranged in an array, located between the first pinhole array disk and the second pinhole array disk;
a connecting shaft connecting the first pinhole array disk, the second pinhole array disk, and the condensing element array disk; and
a motor configured, together with the connecting shaft, to rotate the first pinhole array disk, the second pinhole array disk, and the condensing element array disk, wherein
the first pinhole array disk is attached to the connecting shaft so that one first pinhole is positioned at a first focal plane of one condensing element in the condensing element array disk, and
the second pinhole array disk is attached to the connecting shaft so that one second pinhole is positioned at a second focal plane of one condensing element in the condensing element array disk,
wherein the first focal plane is located on one side of the condensing element array disk and the second focal plane is located on an opposite side of the condensing element array disk which is opposite to the one side, and
the first focal plane is a focal plane of a first irradiation light which moves from the opposite side to the one side of the array disk, and the second focal plane is a focal plane of a second irradiation light which moves from the one side to the opposite side of the array disk.

2. The confocal scanner according to claim 1, further comprising a branching element disposed between the first pinhole array disk and the condensing element array disk and/or between the second pinhole array disk and the condensing element array disk.

3. The confocal scanner according to claim 1, wherein
the plurality of first pinholes is arranged in the first pinhole array disk at equal pitch and in a spiral, and
the plurality of second pinholes is arranged in the second pinhole array disk at equal pitch and in a spiral.

4. The confocal scanner according to claim 1, wherein an arrangement of the plurality of first pinholes in the first pinhole array disk and an arrangement of the plurality of second pinholes in the second pinhole array disk are identical.

5. A confocal scanner system comprising:
the confocal scanner according to claim 1;
a first optical system comprising a first confocal scanner formed by a combination of the first pinhole array disk and the condensing element array disk, the first optical system being configured to guide the first irradiation light through the first confocal scanner to a microscope that contains a sample and guide first light to be measured based on the first irradiation light from the sample to a first detector, the first light to be measured contributing to a first confocal image; and
a second optical system comprising a second confocal scanner formed by a combination of the second pinhole array disk and the condensing element array disk, the second optical system being configured to guide the second irradiation light through the second confocal scanner to the microscope and guide second light to be measured based on the second irradiation light from the sample to a second detector, the second light to be measured contributing to a second confocal image.

6. The confocal scanner system according to claim 5, wherein the first optical system comprises a first set of relay lenses connecting a pinhole surface of the first pinhole array disk and an image plane of the microscope in a conjugate relationship and a second set of relay lenses connecting a pinhole surface of the first pinhole array disk and a light-receiving surface of the first detector in a conjugate relationship.

7. A confocal microscope system comprising:
the confocal scanner system according to claim 5;
a first light source configured to irradiate the first irradiation light that enters the confocal scanner system;
a second light source configured to irradiate the second irradiation light that enters the confocal scanner system;
the microscope containing the sample irradiated by the first irradiation light and the second irradiation light;
the first detector configured to detect the first light to be measured from the sample; and
the second detector configured to detect the second light to be measured from the sample.

8. The confocal microscope system of claim 7, wherein
a diameter of the first pinholes is determined based on a wavelength of the first irradiation light, and
a diameter of the second pinholes is determined based on a wavelength of the second irradiation light.

9. The confocal microscope system of claim 7, wherein
the first light source irradiates first irradiation light having a first wavelength and a third wavelength,
the second light source irradiates second irradiation light having a second wavelength and a fourth wavelength,
the first detector includes a pair of detectors configured respectively to detect the first light to be measured based on the first wavelength and on the third wavelength,
the second detector includes a pair of detectors configured respectively to detect the second light to be measured based on the second wavelength and on the fourth wavelength, and
the first wavelength, the second wavelength, the third wavelength, and the fourth wavelength increase in length in this order.

* * * * *